(12) United States Patent
Choi

(10) Patent No.: US 7,350,412 B1
(45) Date of Patent: Apr. 1, 2008

(54) VEHICLE'S FUEL TANK EQUIPPED WITH TWO FUEL OUTLET TUBES

(76) Inventor: Young III Choi, 305 E. Valencia Ave., #P, Burbank, CA (US) 91502

( * ) Notice: Subject to any disclaimer, the term of this patent is extended or adjusted under 35 U.S.C. 154(b) by 0 days.

(21) Appl. No.: 11/645,312

(22) Filed: Dec. 26, 2006

(51) Int. Cl.
*G01F 23/36* (2006.01)

(52) U.S. Cl. ........................................... 73/307
(58) Field of Classification Search ................. 73/307
See application file for complete search history.

(56) References Cited

U.S. PATENT DOCUMENTS 4,967,181 A * 10/1990 Iizuka et al. ............. 340/450.2
5,560,344 A * 10/1996 Chan ......................... 123/515

* cited by examiner

*Primary Examiner*—Hezron Williams
*Assistant Examiner*—Paul M West

(57) ABSTRACT

A fuel tank, which is equipped with two fuel outlet tubes that are merged to one fuel injection pipe to engine, is provided. First fuel outlet tube is located at a corner of the bottom of the fuel tank. Second fuel outlet tube is located on a wall just 2.5 centimeter above the first fuel outlet tube. A fuel level gauge, on instrument panel in front of a driver's seat, turns on 'red' signal when a floating valve in the fuel tank reaches to a level 2.5 centimeter above the second fuel outlet tube. When the floating valve reaches a level of the second fuel outlet tube, needle of the level gauge indicates the bottom of the level gauge. Though the gauge indicates that the fuel tank is empty, gasoline in the fuel tank is fed to the engine. Purpose of the current invention is to alert the driver of the vehicle that fuel must be charged immediately.

1 Claim, 3 Drawing Sheets

VEHICLE'S FUEL TANK EQUIPPED WITH TWO FUEL OUTLET TUBES

FIELD OF THE INVENTION

This invention relates to a fuel tank of a motor vehicle, especially to a fuel tank that has two fuel outlet tubes connected one fuel injection pipe to engine.

BACKGROUND OF THE INVENTION

Most of spare fuel tanks disposed either as a separate type, outside the main fuel tank, or as a built-in type, inside the same or integrally constructed therewith. The separate type, in some cases, communicates with the main tank, but it must then be more carefully checked for fear of being in-advertently emptied. The latter type appeared as an advanced type, and is widely used today. In one bottom corner of a main tank a certain space is separately occupied, in this type, for a spare tank by means of secluding or separating plates welded to the main tank. This advanced built-in type is apparently very convenient and practical in that it does not need individual or dual supplying of fuel because of automatic and simultaneous fuel supplying to both, and that it dispenses with the communication through piping between both tanks. However, their manufacturing cost is high. It is purpose of the current application to provide a less expensive fuel tank that notices to the driver to recharge gasoline well before the fuel tank is advertently emptied.

DESCRIPTION OF THE PRIOR ART

U.S. Pat. No. 1,419,145 to Kleinberg and U.S. Pat. No. 2,644,514 to Potter Illustrate a spare fuel tank installed in a main fuel tank. The driver must get out of the car and operate a valve manually to release the fuel in the spare tank. U.S. Pat. No. 1,400,727 to Codd, U.S. Pat. No. 1,535,642 to Armknecht, and U.S. Pat. No. 1,671,242 Huthsing illustrate emergency fuel reservoir of cylinder shape dipped in a main fuel tank. To release the reserved fuel, the driver should operate manually the releasing means. U.S. Pat. No. 4,178,004 to Shinoda, et al. illustrates a spare fuel tank of vertically elongated shape and having a spare fuel suction pipe, which are installed inside of a main fuel tank. To release the fuel in the spare tank, the driver also approach to the switch valve, which is attached, on the fuel feeding line attached on the fuel tank assembly. U.S. Pat. No. 6,505,644 to Coha, et al. illustrates a dual barrel jet fuel pump assembly for a fuel tank in a vehicle including a reservoir adapted to be disposed in a primary side of the fuel tank and having a top defining an overflow fuel level of the reservoir. Their design is applicable only to a dual barrel jet fuel pump assembly equipped fuel tank. U.S. Pat. No. 6,886,582 to Choi, the same inventor of the current application, illustrates a spare fuel tank, installed inside a main fuel tank. However, manufacturing cost is expensive. None of the prior art illustrates a simple and easy to make fuel tank that informs driver about timing to charge fuel well before the fuel tank is in-advertently emptied.

SUMMARY OF THE INVENTION

It is a primary object of this invention to provide a fuel tank of a motor vehicle that eliminates the short comings of the prior art and inform the timing to refill the fuel tank to the driver of a motor vehicle well before the fuel tank is inadvertently emptied. It is another object of this invention to provide a fuel tank, which does not need the constant checking of if it is unexpectedly emptied. Though the driver finds that the fuel level gauge on the instrument panel indicates bottom, i.e., empty, there is some fuel left in the fuel tank to find a gas station near by. To realize those goals a fuel tank, which is equipped with two fuel outlet tubes that are merged to one fuel injection pipe to engine, is provided. First fuel outlet tube is located at a corner of the bottom of the fuel tank. Second fuel outlet tube is located on a wall just 2.5 centimeter above the first fuel outlet tube. A fuel level gauge, on instrument panel in front of a driver's seat, turns on 'red' signal when a floating valve in the fuel tank reaches to a level 2.5 centimeter above the second fuel outlet tube. When the floating valve reaches a level of the second fuel outlet tube, needle of the level gauge indicates the bottom of the level gauge. Though the gauge indicates that the fuel tank is empty, gasoline in the fuel tank is fed to the engine through the first fuel outlet tube, which is located at a corner of the bottom of the fuel tank.

DETAILED DESCRIPTION OF THE PREFERRED EMBODIMENTS

Figure 1:
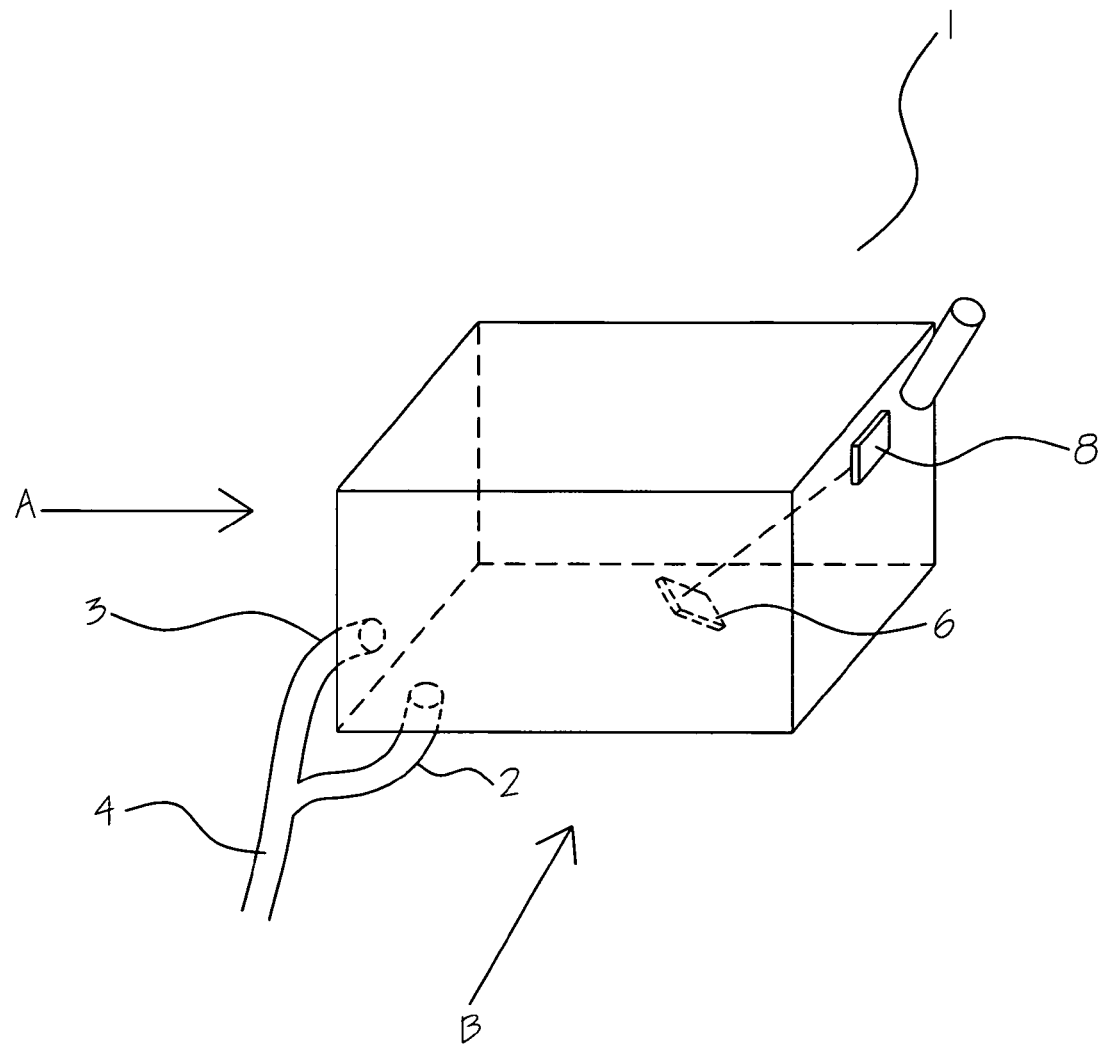
FIG. 1 is a perspective view of a motor vehicle fuel tank equipped with two fuel outlet tubes that are merged to one fuel injection pipe to engine according to current application.

FIG. 1 is a perspective view of a motor vehicle fuel tank (1) equipped with two fuel outlet tubes (2) and (3) that are merged to one fuel injection pipe (4) to engine according to current application. First fuel outlet tube (2) is located at a corner of the bottom of the fuel tank (1). Second fuel outlet tube (3) is located on a side wall just 2.5 centimeter above the first fuel outlet tube (2).

Figure 2:
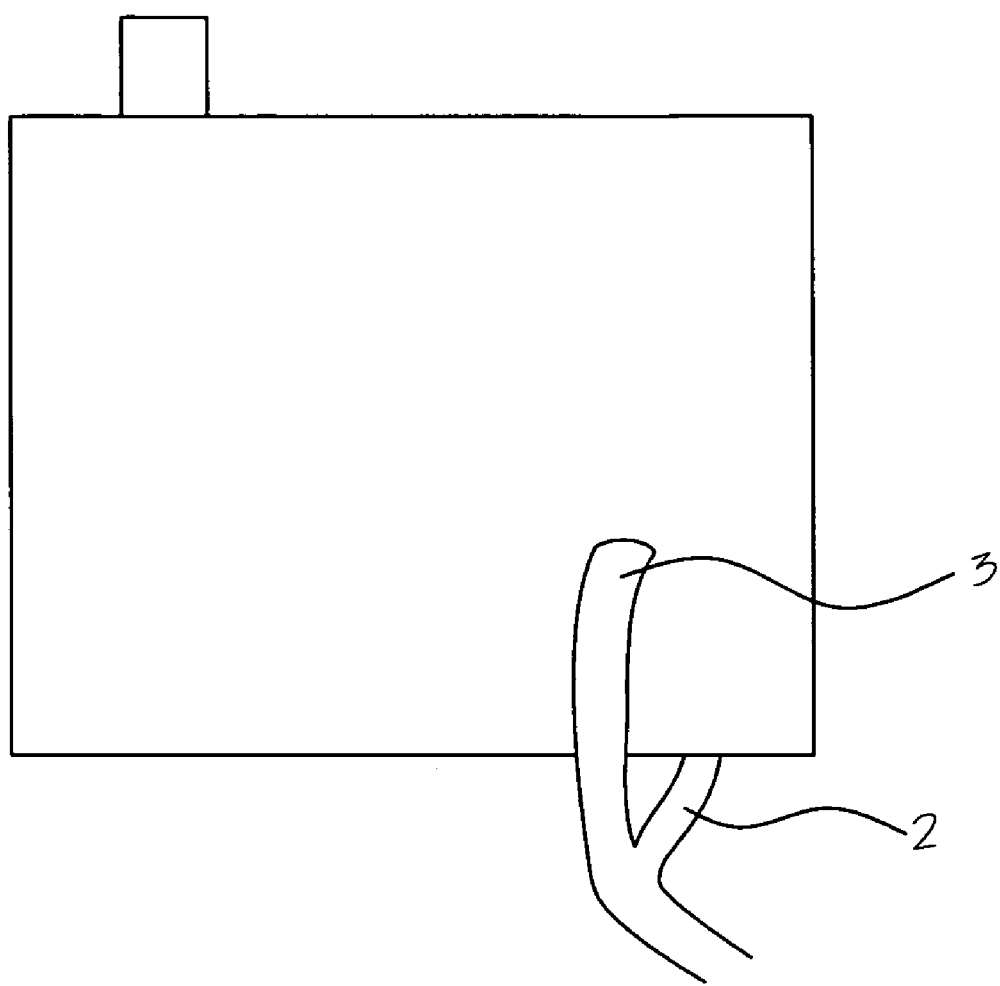
FIG. 2 is a side view of a motor vehicle fuel tank equipped with two fuel outlet tubes that are merged to one fuel injection pipe to engine according to current application seen from 'A' side in FIG. 1.
Figure 3:
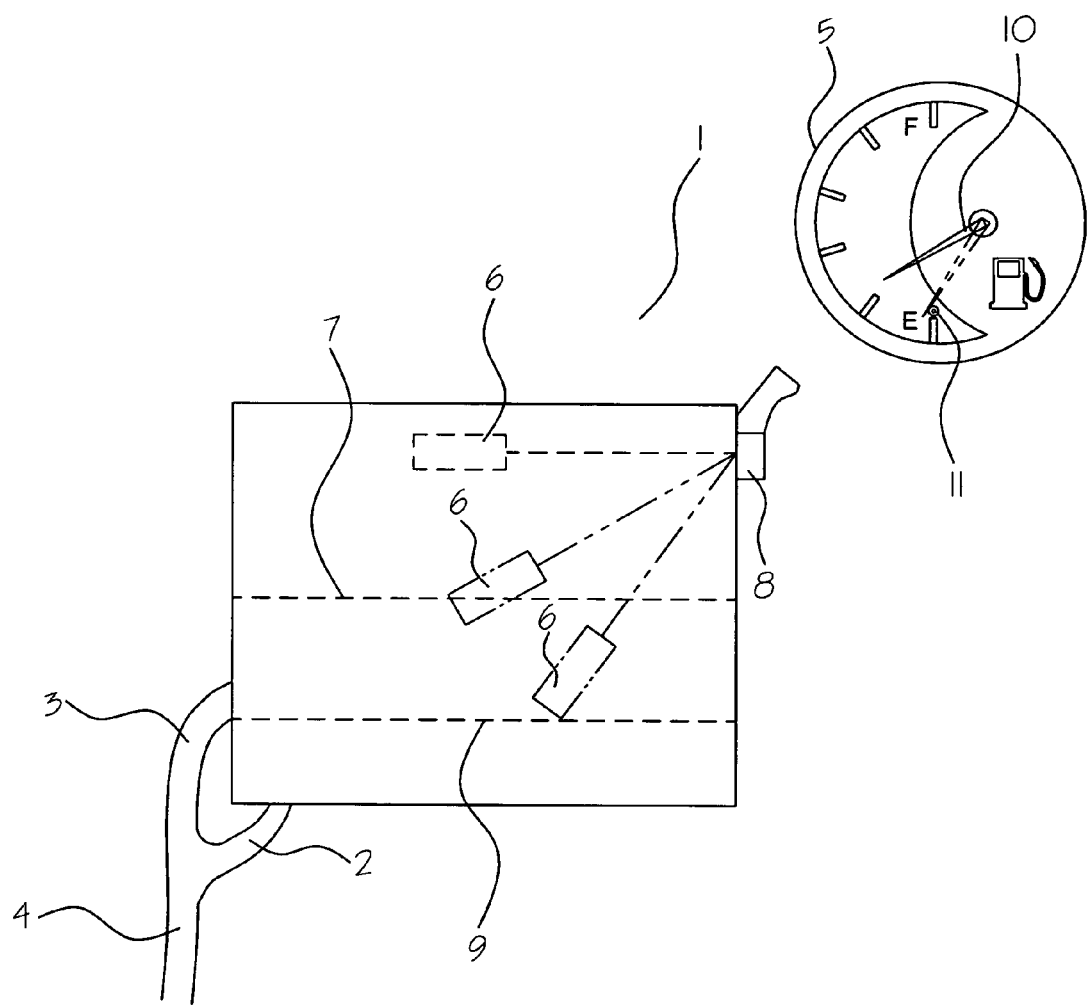
FIG. 3 is a side view of a motor vehicle fuel tank equipped with two fuel outlet tubes that are merged to one fuel injection pipe to engine according to current application seen from 'B' side in FIG. 1.

FIG. 2 is a side view of a motor vehicle fuel tank (1) equipped with two fuel outlet tubes that are merged to one fuel injection pipe (4) to engine according to current application seen from 'A' side in FIG. 1. And FIG. 3 is a side view of a motor vehicle fuel tank (1) equipped with two fuel outlet tubes that are merged to one fuel injection pipe (4) to engine according to current application seen from 'B' side in FIG. 1.

A fuel level gauge (5), on instrument panel in front of a driver's seat, turns on 'red' signal when a floating valve (6) in the fuel tank reaches to a level (7) 2.5 centimeter above the second fuel outlet tube (3). Physical position of the floating valve (6) is electrically connected to the fuel level gauge (5) by a converter (8). When the floating valve (6) reaches to another level (9) of the second fuel outlet tube (3), needle (10) of the level gauge touches the bottom (11), empty sign, of the level gauge (5). As the needle (10) of the gauge touches the bottom (11), alarm sound is activated to inform the driver that the fuel tank must be filled again.

If the driver can find a gas station and fill up gasoline before the needle (10) indicates empty sign, everything is fine. Even though the driver can not find a gas station when read the sign that the fuel tank is empty, the driver has some gasoline left in the tank that is enough to find a gas station near around at least 10 miles. Alarm sound reminds the driver that fills up the gasoline is the first priority than other things.

What is claimed is:

1. A fuel tank is equipped with;
   a first fuel outlet tube that is located at a corner of the bottom of the fuel tank, and
   a second fuel outlet tube is located on a side wall just 2.5 centimeter above the first fuel outlet tube, and
   a floating valve in the fuel tank whose physical position is electrically connected by a converter to a fuel level gauge, which is installed on instrument panel in front of a driver's seat and
      turns on 'red' signal when the floating valve reaches to a level 2.5 centimeter above the second fuel outlet tube and needle of the level gauge touches the bottom, empty sign, of the level gauge when the floating valve reaches to another level of the second fuel outlet tube, and
   activates alarm sound to inform the driver as the needle of the gauge touches the bottom.

* * * * *